(12) United States Patent
Wang et al.

(10) Patent No.: US 6,230,380 B1
(45) Date of Patent: May 15, 2001

(54) SLIDER FOR BURNISHING A DISC

(75) Inventors: Ling Wang, Eden Prairie; Li Li, Bloomington, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/112,954

(22) Filed: Jul. 9, 1998

Related U.S. Application Data

(60) Provisional application No. 60/075,007, filed on Feb. 17, 1998.

(51) Int. Cl.[7] .......................... B21C 37/30; B24B 21/00; B24B 5/00; G11B 15/64
(52) U.S. Cl. ........................ 29/90.01; 451/312; 451/317; 360/103
(58) Field of Search .......................... 29/90.01; 360/104, 360/103, 327, 110, 313, 237, 234.1, 236.8; 451/317, 290, 5, 63, 312, 313, 324; 51/293

(56) References Cited

U.S. PATENT DOCUMENTS

| | | |
|---|---|---|
| 4,845,816 * 7/1989 | Nanis | 29/90.01 |
| 5,063,712   11/1991 | Hamilton et al. | 51/67 |
| 5,067,037 * 11/1991 | Ananth et al. | 360/103 |
| 5,200,867 *  4/1993 | Albrecht et al. | 360/234.1 |
| 5,267,104 * 11/1993 | Albrecht et al. | 360/103 |
| 5,431,592    7/1995 | Nakata | 451/63 |
| 5,658,191    8/1997 | Brezoczky | 451/324 |
| 5,659,447 *  8/1997 | Gregory et al. | 360/103 |
| 5,708,540 *  1/1998 | Ananth et al. | 360/103 |
| 5,782,680    7/1998 | Pilsan | 451/317 |
| 5,825,181 * 10/1998 | Schaenzer et al. | 360/103 |
| 5,841,608 * 11/1998 | Kasamatsu et al. | 360/103 |
| 5,980,369 * 11/1999 | Burga et al. | 451/317 |
| 6,003,364 * 12/1999 | Yao et al. | 73/105 |
| 6,040,958 *  3/2000 | Yamamoto et al. | 360/236.3 |

* cited by examiner

Primary Examiner—P. W. Echols
Assistant Examiner—Marc Jimenez
(74) Attorney, Agent, or Firm—Westman, Champlin & Kelly, P.A.

(57) ABSTRACT

A system for burnishing a disc includes a slider having burnish pads. The burnish pads are disposed on air bearing surface of the slider and extends therefrom. The burnish pad includes a burnish face which configured to burnish a surface of the disc and blow away burnished asperities.

17 Claims, 8 Drawing Sheets

SLIDER FOR BURNISHING A DISC

CROSS-REFERENCE TO RELATED APPLICATION

This application claims the priority of an earlier filed co-pending provisional application Ser. No. 60/075,007, filed Feb. 17, 1998, entitled "THERMAL BURNISH AIR BEARING CONFIGURATION—STREAM LINE PAD AAB."

BACKGROUND OF THE INVENTION

The present invention relates to disc drive systems. More specifically, the present invention relates to an apparatus for burnishing asperities or surface irregularities on a disc surface.

In data processing systems, magnetic disc drives are often used as storage devices. In such devices, read/write heads which are located on a slider (or an air bearing) are used to write data on or read data from an adjacently rotating disc. The head is located either above or under the disc and isolated therefrom by a thin film of air. The thickness of the thin film of air depends on the disc's rotational speed and the shape of air bearing surface. During drive operation, the fly height of the head continuously changes as the head pitches and rolls with the varying topography of the disc. If the quality of the disc or the read/write head is poor, occasional rubbing or sharp contact may occur between the disc and the head. Such contact may damage the head or the disc, or cause loss of valuable data.

With increasing magnetic recording density, the head fly height (or slider clearance) becomes lower and lower. In other words, the contact frequency between disc and head becomes larger. A fly height of as low as $0.7\mu"$ is currently used in magneto-resistance reading. To prevent damage to either the disc or head for such low slider clearance, it has been recognized that the surface of the disc should be very flat and free of any bumps.

Various attempts have been made to provide increasing assurance that undesirable contact between a head and a recording disc does not occur. Rigid manufacturing and quality specifications for both the recording disc and the head have been instituted. One such attempt in the disc industry is to glide test all discs. If a bump or asperity is found on the surface of the disc, the bump must be burnished out by a thermal burnishing air bearing.

The burnishing air bearing helps to produce the highest quality media at every level. Thus, there is a need to provide an efficient burnishing air bearing design which has high production yields, low to zero noise in the burnish process, and relatively flat fly heights with nearly zero roll.

SUMMARY OF THE INVENTION

A disc burnishing system has burnish pads located on the air bearing surface. The air bearing surface provides aerodynamic life to the slider body in response to air flow thereunder. The burnish pad is located on the trailing end of slider and extends therefrom. The burnish pad includes a burnish face which is shaped to behave like a knife at the same time to reduce particle accumulation thereon.

DETAILED DESCRIPTION OF THE PREFERRED EMBODIMENTS

Figure 1:
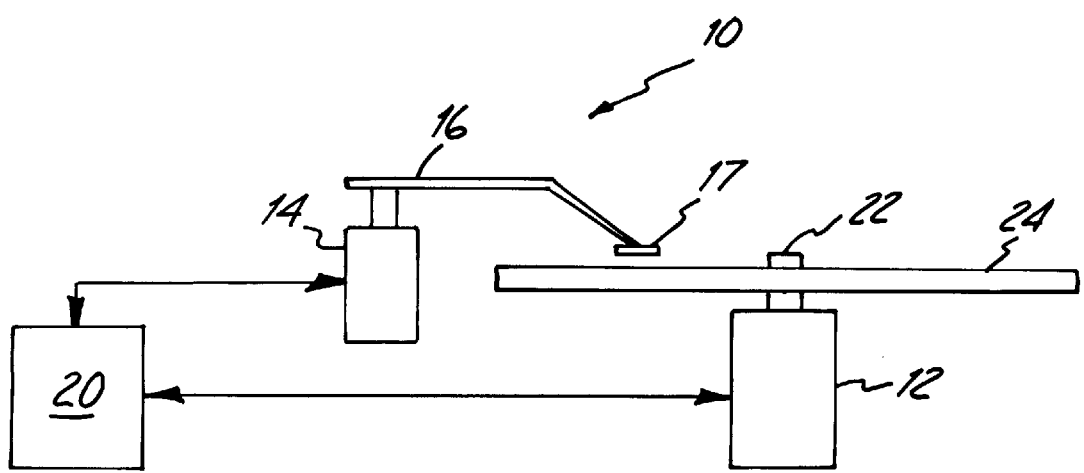
FIG. 1 is a block diagram of an apparatus for burnishing a disc surface in accordance with the present invention.

FIG. 1 is a block diagram of disc burnishing system 10 in which the burnishing air bearing of the present invention is particularly useful. System 10 includes spindle motor 12, actuator 14, suspension assembly 16, burnishing slider 17 and controller 20.

Spindle motor 12 is operably coupled to controller 20 and includes spindle 22 which detachably couples to a disc 24. Upon energization, spindle motor 12 causes spindle 22 and disc 24 to rotate.

Slider 17 is suspended above disc 24 by suspension assembly 16. Suspension assembly 16 is coupled to actuator 14 such that upon energization of actuator 14, suspension assembly 16 causes slider 17 to move over the surface of disc 24. When disc 24 rotates, slider 17 will fly above disc 24 on a small film of air (air bearing). The height at which slider 17 flies over disc 24 is controlled by various factors including, the preload force of suspension assembly 16, the aerodynamic characteristics of slider 17, and the rotational speed of disc 24. Varying these parameters will vary the fly height of slider 17 over disc 24.

Controller 20 is coupled to actuator 14 and spindle motor 12. Thus, controller 20 is able to control the location of slider 17 over disc 24, and by varying the energization signal to spindle motor 12, the fly height of slider 17 over disc 24.

Figure 2:
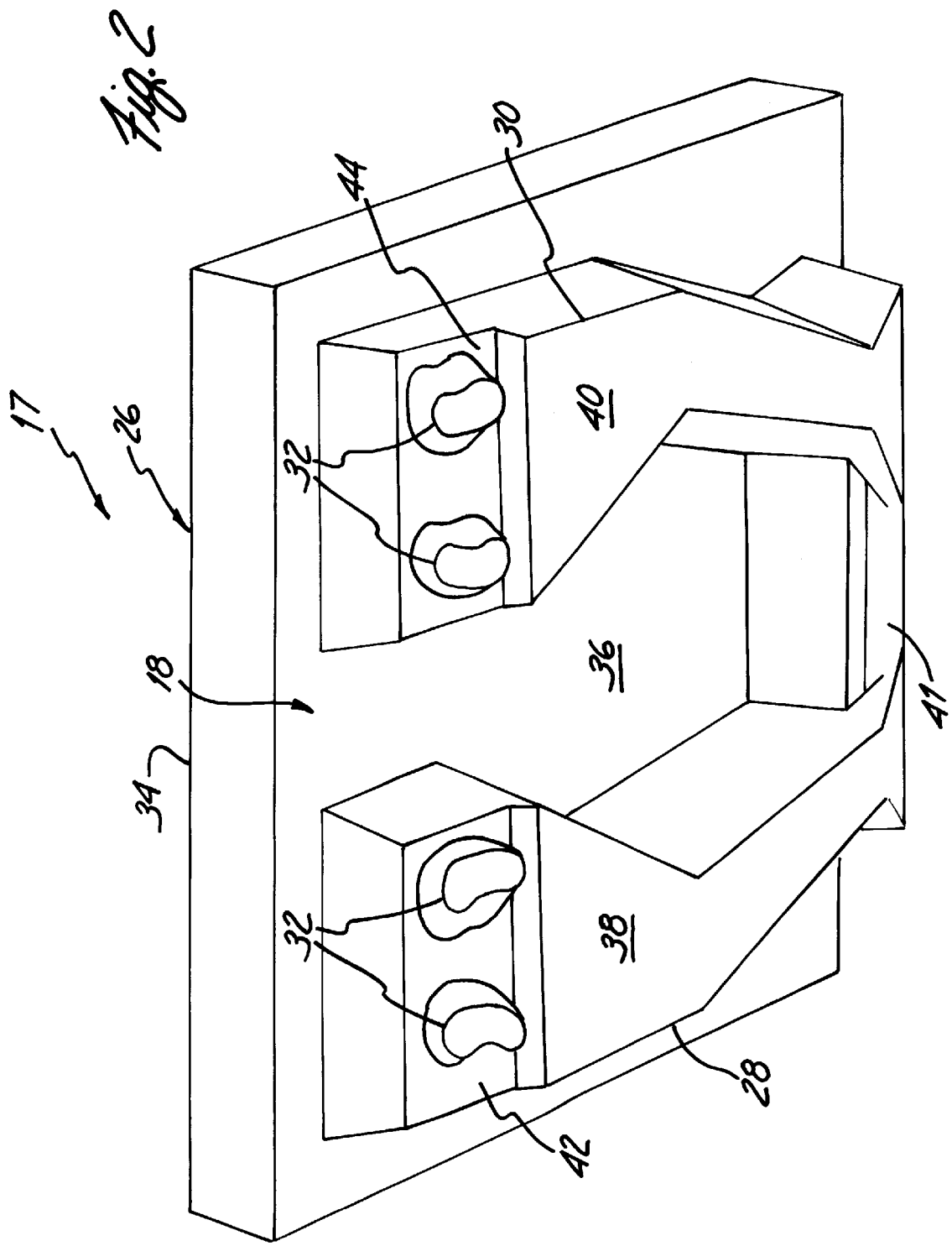
FIG. 2 is a bottom perspective view of a burnishing air bearing in accordance with the present invention.

FIG. 2 is a bottom perspective view of slider 17 showing air bearing surface 18 in accordance with the present invention. Slider 17 includes body 26, first rail 28, second rail 30 and stream line burnish pads 32. Body 26 includes upper surface 34, and lower surface 36. Both first and second rails 28,30 are disposed on and extend from lower surface 36 of body 26. First rail 28 includes first rail air bearing surface 38, and second rail 30 includes second rail air bearing surface 40.

Those skilled in the art will appreciate that first and second rails 28 and 30 and leading edge 41 are shaped to create a negative air pressure in areas between first rail 28 and second rail 30. Although described with respect to a negative pressure air bearing, the present invention may be practiced with any air bearing. A negative pressure air bearing is merely preferred because the negative pressure air bearing provides faster take off, higher stiffness, less altitude sensitivity, and less velocity sensitivity than other air bearing designs. Further, for thermal burnish applications, a low pitch and nearly zero negative roll are required. By employing a slider with nearly zero negative roll, such as air bearing 18, the outside rail of the slider will be the active rail and thus the disc surface may be effectively burnished, especially the outer radial disc surface. Further, a low pitch slider, such as air bearing 18 provides enhanced stability which facilitates effective burnishing.

As can be seen in FIG. 2 first rail 28 and second rail 30 preferably include recessed trailing portions 42, and 44 respectively. Recessed portions 42 and 44 preferably lie within a plane, which is between the plane of air bearing surfaces 38, 40 and bottom surface 36. Stream line burnish pads 32 are preferably disposed on recess portions 42, 44 and extend therefrom. Additionally, stream line burnish pads 32 preferably extend from recessed portions 42, 44 a sufficient distance such that stream line burnish pads 32 in the same plane as, or slightly pass through, the plane defined by air bearing surfaces 38, 40. Thus, stream line burnish pads 32 can be extended slightly further from lower surface 36 of body 26 than first rail 28 and second rail 30. Considering pitch angle, when air bearing 18 flies, stream line burnish pads 32 are positioned nearest disc 24 and thus are generally the only locations which make physical contact with the surface of disc 24.

Figure 3:
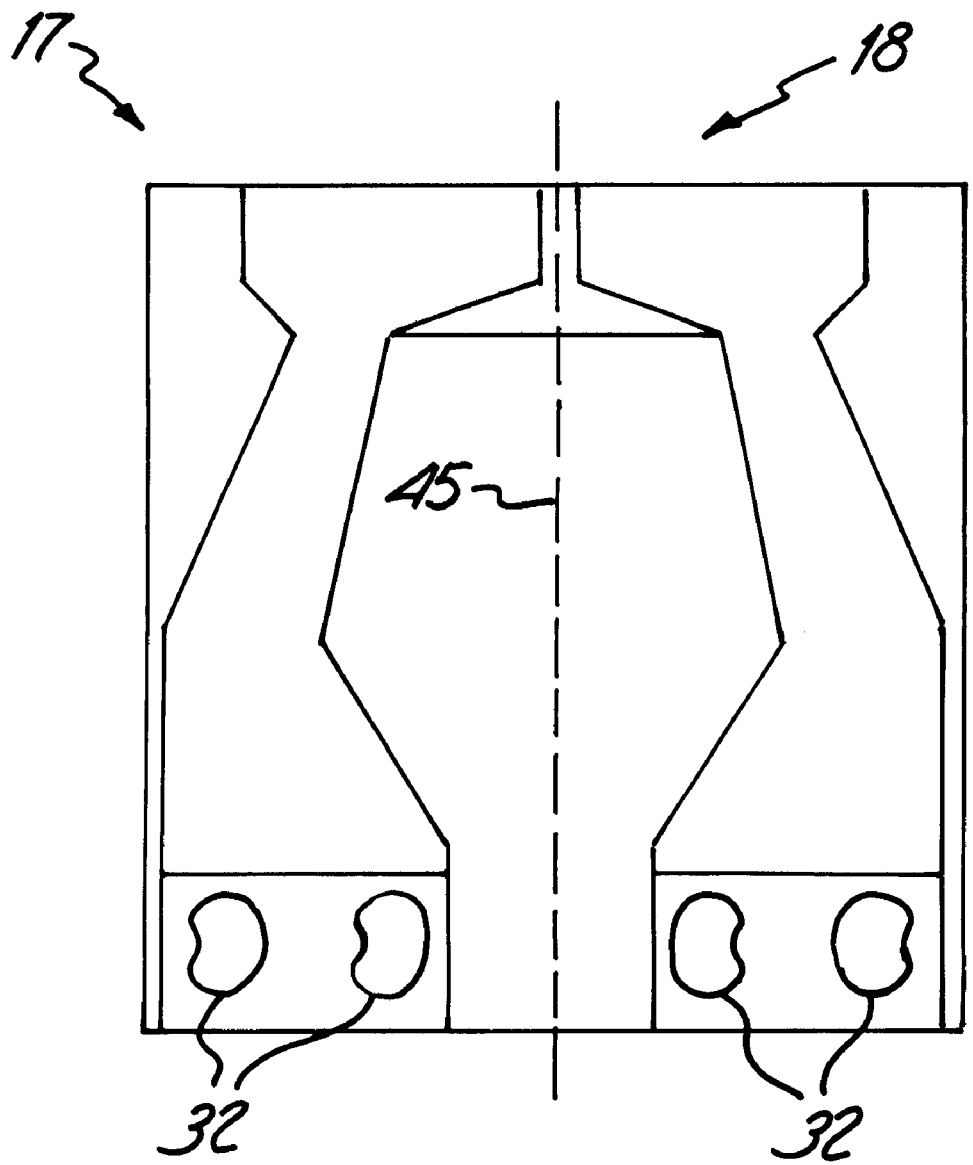
FIG. 3 is a bottom plan view of a burnishing air bearing in accordance with the present invention.

FIG. 3 is a bottom plan view of slider 17 in accordance with the present invention. As can be seen, air bearing 18 is preferably symmetric about dashed line 45 such that a given air bearing may be used as either an up or down burnishing air bearing. Using a symmetric design improves the manufacturing yield of the thermal burnishing air bearing of the present invention. For example, if the radially outer pad is used for burnishing, the slider may also be used in the up position if outer pads are damaged. However, it should be noted that the present invention may be practiced with non-symmetric designs.

As can also be seen in FIG. 3, stream line burnish pads 32 preferably have multiple curved surfaces forming essentially elliptical pads with a semi-circular portion removed.

Figure 4:
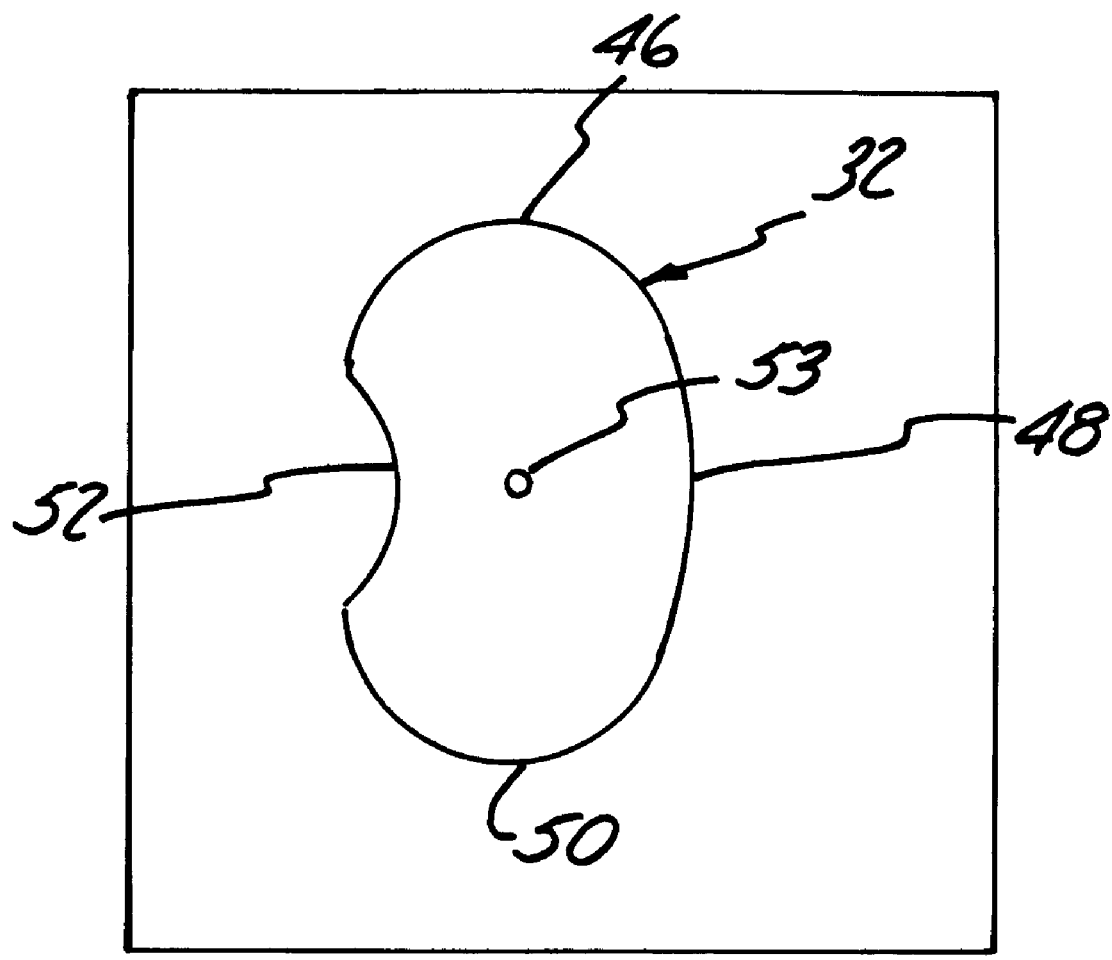
FIG. 4 is a bottom plan view of a burnish pad in accordance with the present invention.

FIG. 4 is an enlarged bottom plan view of one of thermal burnish pads 32. Thermal burnish pad 32 includes curved leading edge 46, first curved lateral edge 48, curved trailing edge 50, and second curved lateral edge 52. Curved leading edge 46 is connected to first curved lateral edge 48 and second curved lateral edge 52 which are each connected to curved trailing edge 50. Preferably, curved leading edge 46 and curved trailing edge 50 have the same curvature. Additionally, first curved lateral edge 48 preferably has a curvature that is less than that of curved leading edge 46 and curved trailing edge 50. Further, it is also preferred that second curved lateral edge 52 have a curvature which is different than that of curved leading edge 46, first curved lateral edge 48 and curved trailing edge 50. Moreover, leading edge 46, first curved lateral edge 48 and trailing edge 50 are concave with respect to center 53, while second curved lateral edge 52 is convex with respect to center 53.

The curvatures of stream line burnish pad 32 are preferable because they provide enhanced aerodynamic characteristics to the stream line burnish pads 32 of the present invention. Once stream line burnish pad 32 contacts an irregularity on the disc surface, it cuts or otherwise mechanically removes a portion, if not all of the surface irregularity. The removed portion is preferably carried away immediately otherwise the removed portion can begin dragging on the disc surface with the pad. If this happens, the disc itself may be damaged and electric noise may enlarge or even be created. By providing curvature to edges 46–52 of the stream line burnish pad 32, air flow around the stream line burnish pad 32 will cause the burnish debris to be swept away immediately upon separation from the disc surface. This is because the air velocity stream line will follow the pad curvature as will be described more fully with respect to FIGS. 5 and 6.

Figure 5:
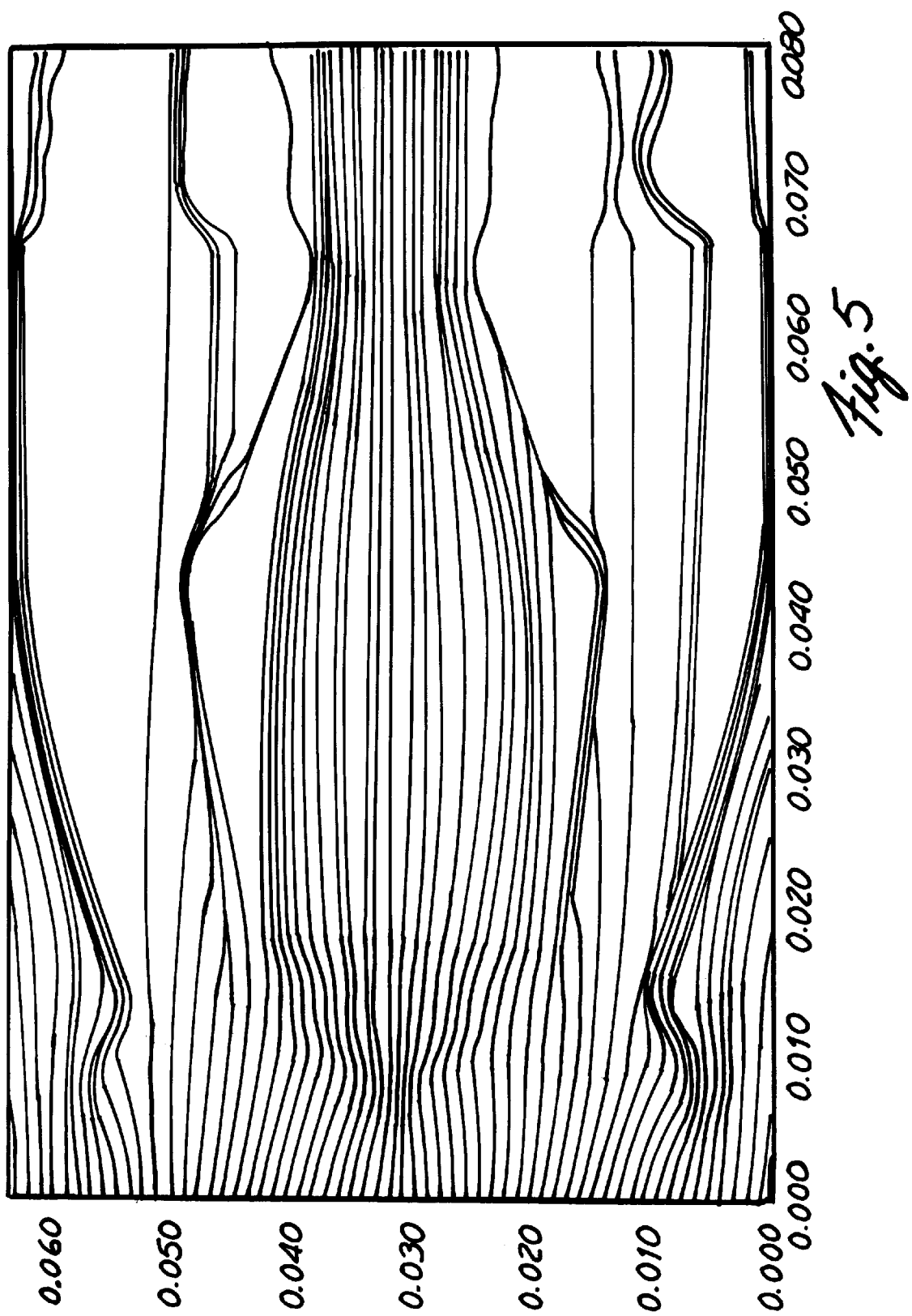
FIG. 5 is a stream line diagram depicting air flow under a burnishing air bearing in accordance with the present invention.
Figure 6:
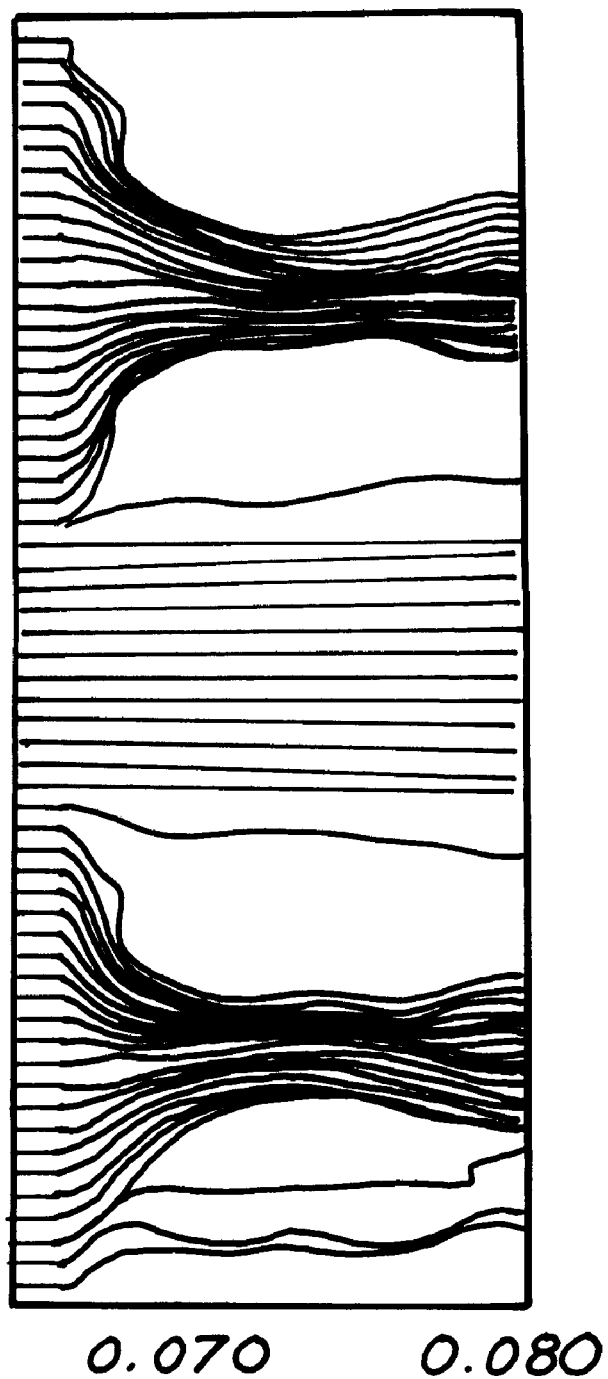
FIG. 6 is a stream line diagram depicting air flow around burnish pads of the present invention.

FIGS. 5 and 6 are stream line diagrams showing air flow under air bearing surface 18 taken along the length and width of slider 17 of the present invention. For clarity, the leading edge of air bearing 18 would be on the left side of FIG. 5, and the trailing edge, including stream line burnish pads 32 would be on the far right side of FIG. 5. As can be seen in FIGS. 5 and 6, air flowing under air bearing 18 will flow around the curved leading edge 46 of stream line burnish pads 32. Thus, debris which is mechanically removed from the disc surface by stream line burnish pads 32 will be blown clear. Such debris will not drag across the disc surface.

Figure 7:
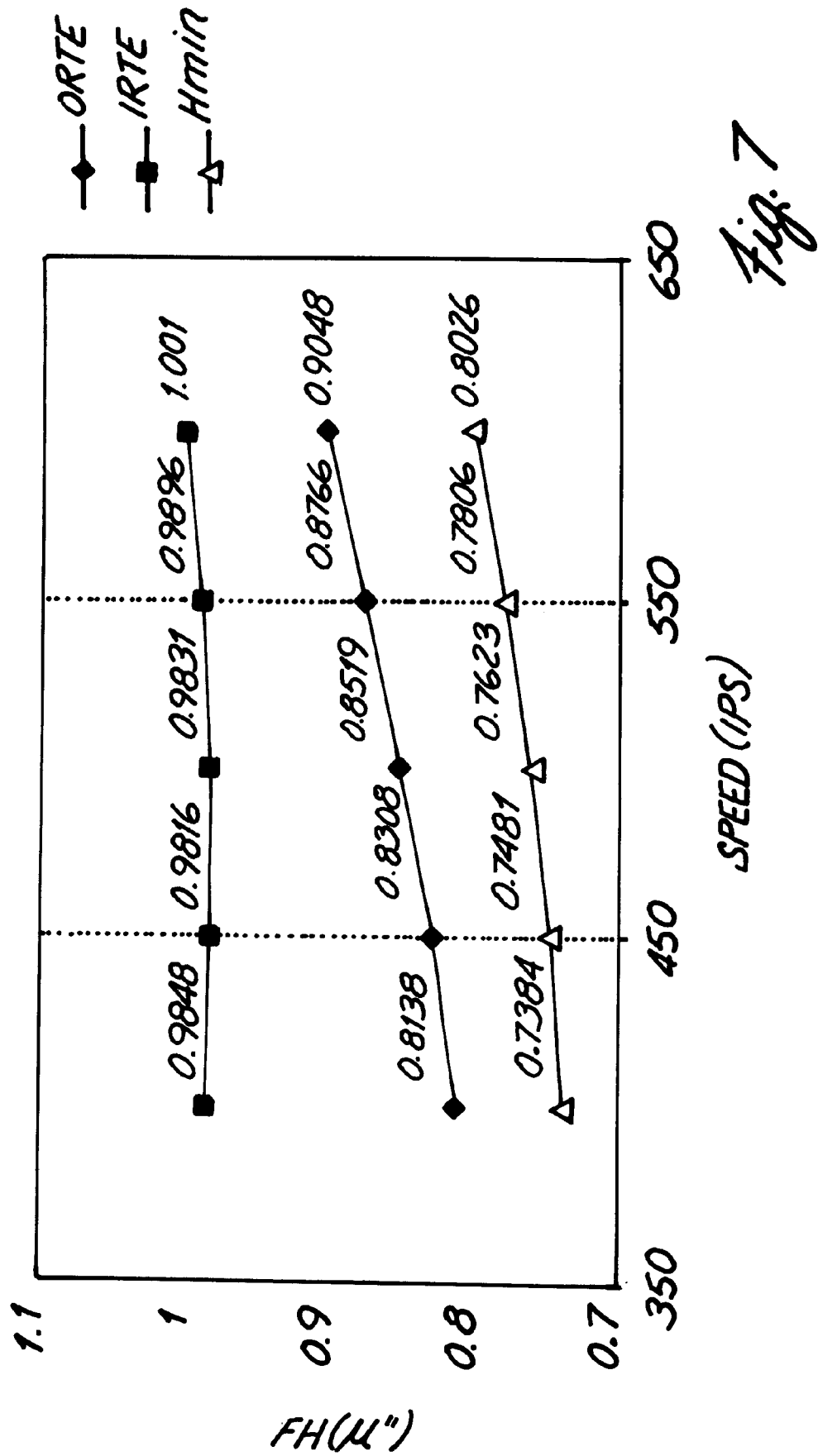
FIG. 7 is a graph depicting fly height versus slider speed for a 3.5 gmf preloaded burnishing air bearing.

FIG. 7 is a chart depicting air bearing fly height for varying linear air bearing speed for a 3.5 gmf preload. FIG. 7 shows that for a speed of approximately 375 inches per second (ips), the outer rail trailing edge (ORTE) of the head will fly at approximately 0.8138 microinches from the disc surface. Additionally, at 375 ips, the inner rail trailing edge (IRTE) will fly at a distance of approximately 0.9848 microinches from the disc surface. FIG. 7 also shows the minimum fly height ($H_{MIN}$). As can be seen in FIG. 7, as the linear speed of the air bearing is increased, the fly height increases as well. However, for a given increase in linear speed, the outer rail trailing edge will increase its fly height more than the inner rail trailing edge.

Figure 8:
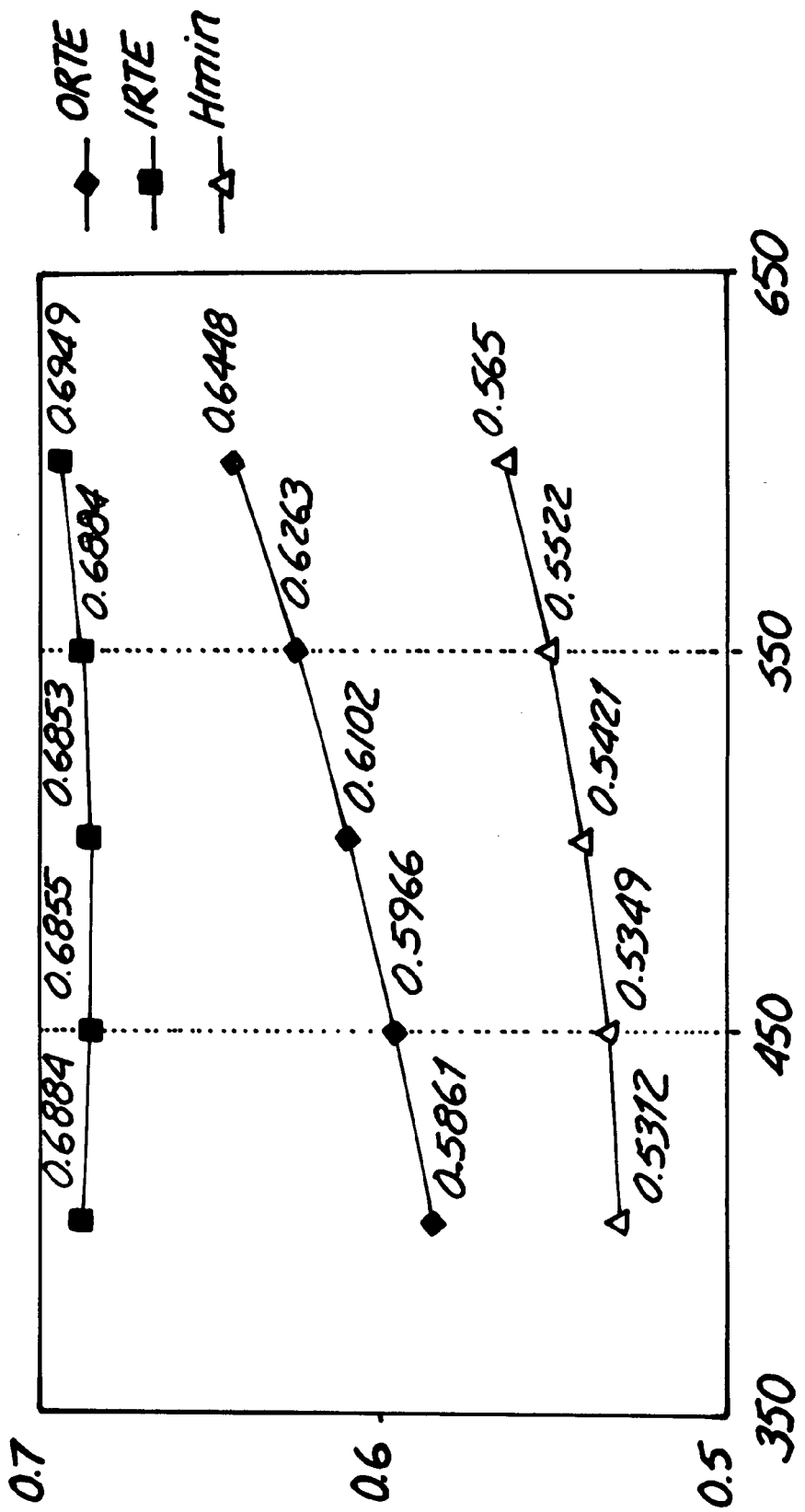
FIG. 8 is a graph depicting fly height versus slider speed for a 6.0 gmf preloaded burnishing air bearing.

FIG. 8 is a chart of fly height versus air bearing linear speed for an air bearing with a 6.0 gmf preload. FIG. 8 shows a comparison of fly heights for the outer rail of the air bearing contrasted with the fly height of the inner rail. As can be seen in FIG. 8, at a linear speed of approximately 400 ips the outer rail trailing edge flies at approximately 0.5861 microinches while the inner rail trailing edge flies at approximately 0.6884 microinches. Additionally, at a slider speed of approximately 600 ips, the outer rail trailing edge flies at approximately 0.6448 microinches while the inner rail trailing edge flies at about 0.6949 microinches. Thus, it can be seen that at a 6.0 gmf preload, the inner rail trailing edge flies at a relatively flat profile over speed variations from approximately 400 ips to approximately 600 ips, while the outer rail trailing edge varies its fly height from about 0.5861 microinches to about 0.6448 microinches over comparable speed variations.

Although the present invention has been described with reference to preferred embodiments, workers skilled in the art will recognize that changes may be made in form and detail without departing from the spirit and scope of the invention. For example, although the present invention has been described with respect to burnishing magnetoresistive discs, the present invention may be practiced upon magneto-optical or optical discs as well. Sliders of the present invention may be fabricated using any desired technique photolithographic masking and ion milling, chemical etching or reactive ion etching. Any number, shape or position of pads may be used. The pads should be of a material sufficiently hard to reduce wear of the pad over extended use.

What is claimed is:

1. A disc burnishing system comprising:
   a motor to rotate a disc;
   an armature;
   a slider carried on the armature over a surface of the disc, the slider including a first rail and an air bearing surface;
   a first burnish pad disposed on the first rail proximate the air bearing surface, the first burnish pad extending toward the disc and having a curved leading edge.

2. The system of claim 1 wherein the first burnish pad is disposed at the trailing edge of the slider.

3. The system of claim 1, wherein the slider further comprises a second burnish pad disposed proximate the air bearing surface extending toward the disc and having a curved leading edge.

4. The system of claim 3 wherein the second burnish pad is spaced transversely from the first burnish pad.

5. The system of claim 1 wherein the slider further comprises a second rail disposed on and extending from the air bearing surface, the second rail having a second rail trailing edge and providing aerodynamic lift to the slider in response to air flow thereunder, and wherein the first burnish pad is disposed proximate the first rail trailing edge.

6. The system of claim 5, wherein the slider further comprises a second burnish pad disposed proximate the air bearing surface and extending toward the disc, the second burnish pad disposed proximate the trailing edge of the second rail trailing edge.

7. The system of claim 5 wherein the slider is a negative pressure air bearing slider.

8. The system of claim 1 wherein the first burnish pad has a burnish face having a center and the first burnish pad includes a leading edge, a trailing edge, a first lateral edge disposed between and connecting the leading edge and the trailing edge, a second lateral edge disposed between and connecting the leading edge and the trailing edge, the leading edge being shaped concave with respect to the center of the burnish face.

9. The system of claim 8 wherein the trailing edge is shaped concave with respect to the center of the burnish face.

10. The system of claim 8 wherein one of the first and second lateral edges is shaped convex with respect to the center of the burnish face.

11. The system of claim 10 wherein the other of the first and second lateral edges is shaped concave with respect to the center of the burnish face.

12. The system of claim 1 wherein the first rail defines an air bearing surface plane, and wherein the first burnish pad includes a surface lying substantially in the air bearing surface plane.

13. A system for burnishing a disc, the system comprising:
a controller providing a spindle motor energization signal and an actuator energization signal;
a spindle motor coupled to the controller and adapted to couple to the disc to provide disc rotation in response to the spindle motor energization signal;
an actuator coupled to the controller and providing actuation in response to the actuator energization signal; and
a burnishing air bearing slider coupled to the actuator, the burnishing air bearing slider including:
a slider body having an upper surface, a lower surface opposed to the upper surface, and a trailing edge;
a first rail disposed on and extending from the lower surface, the first rail having a first rail trailing edge and providing aerodynamic lift to the slider body in response to air flow thereunder; and
a first burnish pad operably coupled to the lower surface and extending toward the disc, the first burnish pad having a burnish face with a curved leading edge.

14. The system of claim 13 wherein the first burnish pad is disposed proximate the trailing edge of the slider body.

15. The system of claim 13 wherein the burnish pad is disposed proximate the trailing edge of the first rail.

16. The system of claim 13 wherein the burnishing air bearing slider further comprises a second burnish pad disposed on the lower surface proximate the trailing edge of the first rail and spaced transversely from the first burnish pad.

17. An apparatus for burnishing a disc, the apparatus comprising:
means for rotating the disc; and
means for burnishing the rotating disc.

* * * * *